(12) United States Patent
Kumamoto et al.

(10) Patent No.: US 9,811,108 B2
(45) Date of Patent: Nov. 7, 2017

(54) ACCELERATOR PEDAL DEVICE

(75) Inventors: Masato Kumamoto, Odawara (JP); Tsuyoshi Ohsawa, Odawara (JP)

(73) Assignee: MIKUNI CORPORATION, Tokyo (JP)

(*) Notice: Subject to any disclaimer, the term of this patent is extended or adjusted under 35 U.S.C. 154(b) by 0 days.

(21) Appl. No.: 14/129,706

(22) PCT Filed: Jun. 22, 2012

(86) PCT No.: PCT/JP2012/065956
§ 371 (c)(1),
(2), (4) Date: Dec. 27, 2013

(87) PCT Pub. No.: WO2013/002132
PCT Pub. Date: Jan. 3, 2013

(65) Prior Publication Data
US 2014/0130633 A1   May 15, 2014

(30) Foreign Application Priority Data
Jun. 27, 2011 (JP) .................................. 2011-141368

(51) Int. Cl.
*G05G 1/40* (2008.04)
*G01B 7/30* (2006.01)
(Continued)

(52) U.S. Cl.
CPC ............ *G05G 1/40* (2013.01); *B60K 26/021* (2013.01); *G01B 7/30* (2013.01); *G05G 1/38* (2013.01);
(Continued)

(58) Field of Classification Search
CPC .. G05G 1/30; G05G 1/38; G05G 1/44; G05G 1/445; G05G 5/03; G05G 5/05;
(Continued)

(56) References Cited

U.S. PATENT DOCUMENTS 5,907,202 A * 5/1999 Muraji ............................ 310/36
2003/0217614 A1* 11/2003 Hauschopp ............ B60K 26/02
74/512
(Continued)

FOREIGN PATENT DOCUMENTS

JP     9-318305       12/1997
JP     2004-17935     1/2004
(Continued)

OTHER PUBLICATIONS

Machine Translation of JP 2008-201312, obtained Feb. 10, 2017.*
International Search Report dated Aug. 7, 2012 in corresponding International Application No. PCT/JP2012/065956.

*Primary Examiner* — Richard W Ridley
*Assistant Examiner* — Brian McGovern

(57) ABSTRACT

An accelerator pedal device includes a housing which pivotably supports a pedal arm, a return spring, a magnetic position sensor which detects an angular position of the pedal arm, and a drive source, a return lever, and a control circuit board serving as an active control mechanism which controls to push back the pedal arm toward a rest position under predetermined conditions, a circuit for a Hall element of the position sensor is arranged on the control circuit board. According to the above, a conventionally-required circuit board dedicated to a position sensor is not required to be arranged and the position sensor is connected via bus bars and the like while eliminating lead wire and the like.

4 Claims, 9 Drawing Sheets

(51) Int. Cl.
  *B60K 26/02* (2006.01)
  *G05G 1/38* (2008.04)
  *G05G 5/03* (2008.04)
  *G05G 1/44* (2008.04)

(52) U.S. Cl.
  CPC .......... *G05G 5/03* (2013.01); *B60K 2026/023* (2013.01); *B60W 2540/10* (2013.01); *G05G 1/44* (2013.01); *Y10T 74/20534* (2015.01)

(58) Field of Classification Search
  CPC  B60K 26/02; B60K 26/021; B60K 2026/022; B60K 2026/023
  USPC .................. 74/512–514, 560; 310/36, 37
  See application file for complete search history.

(56) References Cited

U.S. PATENT DOCUMENTS

2004/0257028 A1* 12/2004 Schulz et al. ................. 318/802
2008/0141820 A1*  6/2008 Park et al. ...................... 74/513
2010/0083789 A1*  4/2010 Osawa et al. .................. 74/513

FOREIGN PATENT DOCUMENTS

| JP | 2008-183963 | 8/2008 |
| JP | 2008-201312 | 9/2008 |
| JP | 2010-111379 | 5/2010 |

\* cited by examiner

ACCELERATOR PEDAL DEVICE

CROSS-REFERENCE TO RELATED APPLICATIONS

This application is a U.S. national stage application of PCT/JP2012/065956 filed Jun. 22, 2012 and claims foreign priority benefit of Japanese Application No. 2011-141368 filed Jun. 27, 2011 in the Japanese Intellectual Property Office, the contents of both of which are incorporated herein by reference.

TECHNICAL FIELD

The present invention relates to an accelerator pedal device applied to a vehicle or the like having a drive-by-wire system, and in particular, relates to an accelerator pedal device including an active control mechanism which generates reaction force (i.e., press-back force) against pedaling force of a pedal arm for danger avoidance, danger notification, or the like.

BACKGROUND ART

There has been conventionally known an accelerator pedal device including a housing which is fixed to a vehicle body of an automobile or the like, a pedal arm which is swigably supported by the housing as integrally including an accelerator pedal, a return spring which returns the pedal arm to a rest position, a hysteresis generating mechanism which exerts urging force to return the pedal arm to the rest position and which generates hysteresis at pedaling force (pedaling load), a magnetic position sensor (APS) which detects an angular position of the pedal arm, a sensor circuit board which provides electric connection of the position sensor (APS), an active control mechanism (a motor as a drive source, a return lever, and a position sensor (MPS) which detects a rotational angle of the drive source) which generates push-back force to push back the pedal arm to the rest position under predetermined conditions, and a control circuit board (control unit) which controls driving of the active control mechanism. Here, a depression amount (angular position) of the accelerator pedal (pedal arm) is detected by the position sensor (APS), engine output control is performed based on the detection signal, and the active control mechanism is controlled to operate under predetermined conditions to push back the pedal arm against pedaling force of a driver (for example, see Patent Literature 1).

Here, in a conventional accelerator pedal device, the circuit board for the position sensor (APS) which detects a rotational angle of the pedal arm and the control circuit board for the control unit which controls driving of the active control mechanism are arranged separately. Accordingly, wiring has become complicated and the device has been upsized owing to increased part count. Further, it has been required to arrange a magnetic shielding plate and the like for blocking magnetic field lines to prevent a magnetic field of a motor included in the active control mechanism from influencing to the position sensor (APS).

CITED LITERATURE

Patent Literature

Patent Literature 1: Japanese Patent Application Laid-Open No. 2010-111379

SUMMARY OF THE INVENTION

To address the above issues, an object of the present invention is to provide an accelerator pedal device which is capable of achieving simplification of structure, reduction in component count, cost reduction, downsizing of the whole device, and the like, reducing or preventing influence of a magnetic field of a drive source which is included in an active control mechanism against a magnetic position sensor (APS) which detects an angular position of a pedal arm, without adopting special measures such as a magnetic shielding plate and the like, and performing active control having high responsibility.

An accelerator pedal device according to the present invention includes a pedal arm which is interlocked with an accelerator pedal; a housing which supports the pedal arm between a rest position and a maximum depression position as being pivotable about a predetermined axis line; a return spring which exerts urging force to return the pedal arm to the rest position; a magnetic position sensor which detects an angular position of the pedal arm; and an active control mechanism including a return lever which exerts return force to the pedal arm as being contacted to the pedal arm to push back the pedal arm toward the rest position under predetermined conditions, a drive source which rotationally drives the return lever with electromagnetic force, and a control circuit board which controls driving of the drive source and which includes a circuit for the position sensor.

According to the above structure, when a driver operates the accelerator pedal and the pedal arm is rotated between the rest position and the maximum depression position, it is possible to generate push-back force to push back the pedal arm against pedaling force of the driver with operation of the active control mechanism under predetermined conditions (for example, in a case that danger avoidance, danger notification or the like is required during operation of a vehicle).

Here, the circuit for the position sensor which detects an angular position of the pedal arm is arranged on the control circuit board of the active control mechanism. Accordingly, a conventionally-required circuit board dedicated to a position sensor is not required to be arranged and the position sensor is connected via bus bars and the like while eliminating lead wire and the like. Thus, it is possible to achieve reduction of assembling workload, cost reduction, device downsizing, and the like while reducing component count.

Further, an angular position (accelerator opening) of the pedal arm is detected directly by the circuit for the position sensor arranged integrally on the control circuit board via a variety of control circuits on the control circuit board. Accordingly, it is not required to arrange a position sensor (MPS) and the like dedicated to detecting a rotational angle of the drive source of the active control mechanism. Thus, simplification of structure, reduction in component count, cost reduction, and the like can be further achieved.

In the above structure, it is possible to adopt a configuration that the housing includes a housing main body which pivotably supports the pedal arm and a housing cover which is connected to the housing main body in a detachably attachable manner, the drive source is arranged at one side of the housing main body, the control circuit board is arranged at the other side of the housing main body, and the position sensor is arranged at an area which is separated from the drive source by a side wall portion of the housing main body.

According to the configuration, the drive source of the active control mechanism is arranged at one side of the housing main body which supports the pedal arm and the control circuit board is arranged at the other side of the housing main body, and further, the position sensor is arranged in an area which is separated from the drive source by the side wall portion of the housing main body. Accordingly, it is possible, without arranging a dedicated magnetic shielding plate or the like, to reduce or prevent influence of a magnetic field of the drive source against a variety of electronic components arranged on the control circuit board and the magnetic position sensor having the circuit thereof arranged on the control circuit board.

In the above structure, it is possible to adopt a configuration that the housing main body includes a first housing main body and a second housing main body which are arranged to sandwich the pedal arm from both sides in the axis line direction, the housing cover includes a first housing cover which is connected to the first housing main body in a detachably attachable manner and a second housing cover which is connected to the second housing main body in a detachably attachable manner, the control circuit board is arranged and held between the first housing main body and the first housing cover, and the drive source is arranged and held between the second housing main body and the second housing cover.

According to the configuration, owing to that the pedal arm is assembled as being sandwiched by the first housing main body and the second housing main body, the pedal arm can be pivotably supported about a predetermined axis line. Further, assembling is performed while the control circuit board is arranged between the first housing main body and the first housing cover and the drive source is arranged between the second housing main body and the second housing cover, so that the control circuit board including a variety of electronic components and circuits is sufficiently separated from the drive source. Accordingly, influence of a magnetic field of the drive source can be reduced or prevented reliably.

In the above structure, it is possible to adopt a configuration that the position sensor includes a ring-shaped armature which is formed of a magnetic material and which is arranged at the pedal arm, an arc-shaped permanent magnet which is connected to an inner circumferential face of the armature, a stator which is formed of a magnetic material and which is arranged at the first housing main body, and a Hall element which is arranged at the first housing main body.

According to the configuration, the armature and the permanent magnet are relatively rotated against the stator and the Hall element with rotation of the pedal arm, and then, variation of magnetic flux density due to the relative rotation movement is detected and output as a voltage signal by the Hall element. Thus, an angular position of the pedal arm can be detected.

In the above structure, it is possible to adopt a configuration that the pedal arm includes a cylindrical portion which is pivotably supported by the housing, the first housing main body includes a columnar portion which is arranged inside the cylinder portion in a non-contact manner, the armature and the permanent magnet are held by the cylindrical portion of the pedal arm, and the stator and the Hall element are arranged inside the columnar portion of the first housing main body.

According to the configuration, the armature and the permanent magnet are held by the cylindrical portion of the pedal while the stator and the Hall element are arranged inside the columnar portion of the first housing main body. Accordingly, a magnetic circuit for detection can be effectively formed, and influence of a magnetic field of the drive source can be reduced or prevented reliably owing to sufficient blocking for the Hall element from the drive source by a wall portion of the first housing main body.

In the above structure, it is possible to adopt a configuration that the drive source includes a rotor which integrally includes a permanent magnet and rotates with electromagnetic force, a coil for magnetization, and a yoke which forms a magnetic path, a temperature sensor which detects temperature of the coil is held at the first housing main body, and a circuit for the temperature sensor is arranged on the control circuit board.

According to the configuration, the drive source can be caused to function as a torque motor which generates rotational torque with appropriate control of powering to the coil. Further, owing to that temperature of the coil is detected by the temperature sensor and ON/OFF of powering to the coil is controlled based on the detected temperature, a fail-safe function can be ensured while preventing overheating.

In the above structure, it is possible to adopt a configuration that the device includes a hysteresis generating mechanism which generates hysteresis at pedaling force of the accelerator pedal as being contacted to the pedal arm, the housing main body includes a cylindrical portion, and the hysteresis generating mechanism includes a pair of sliders which generates pressing force against an inner wall face of the cylindrical portion with a wedge action caused by the pedaling force of the pedal arm as being slidably arranged in the cylindrical portion and an urging spring which urges the pedal arm toward the rest position as being contacted to one of the pair of sliders.

According to the configuration, pedaling force with hysteresis generated by the hysteresis generating mechanism can be obtained while a driver operates an accelerator pedal and the pedal arm is rotated between the rest position and the maximum depression position. Further, under predetermined conditions (for example, in a case that danger avoidance, danger notification or the like is required during operation of a vehicle), it is possible to generate push-back force to push back the pedal arm against pedaling force of the driver with operation of the active control mechanism.

According to the above, it is possible to obtain an accelerator pedal device which is capable of achieving simplification of structure, reduction in component count, cost reduction, downsizing of the whole device, and the like, reducing or preventing influence of a magnetic field of a drive source which is included in an active control mechanism against a magnetic position sensor (APS) which detects an angular position of a pedal arm, without adopting special measures such as a magnetic shielding plate and the like, and performing active control having high responsibility.

EMBODIMENT OF THE INVENTION

Figure 1:
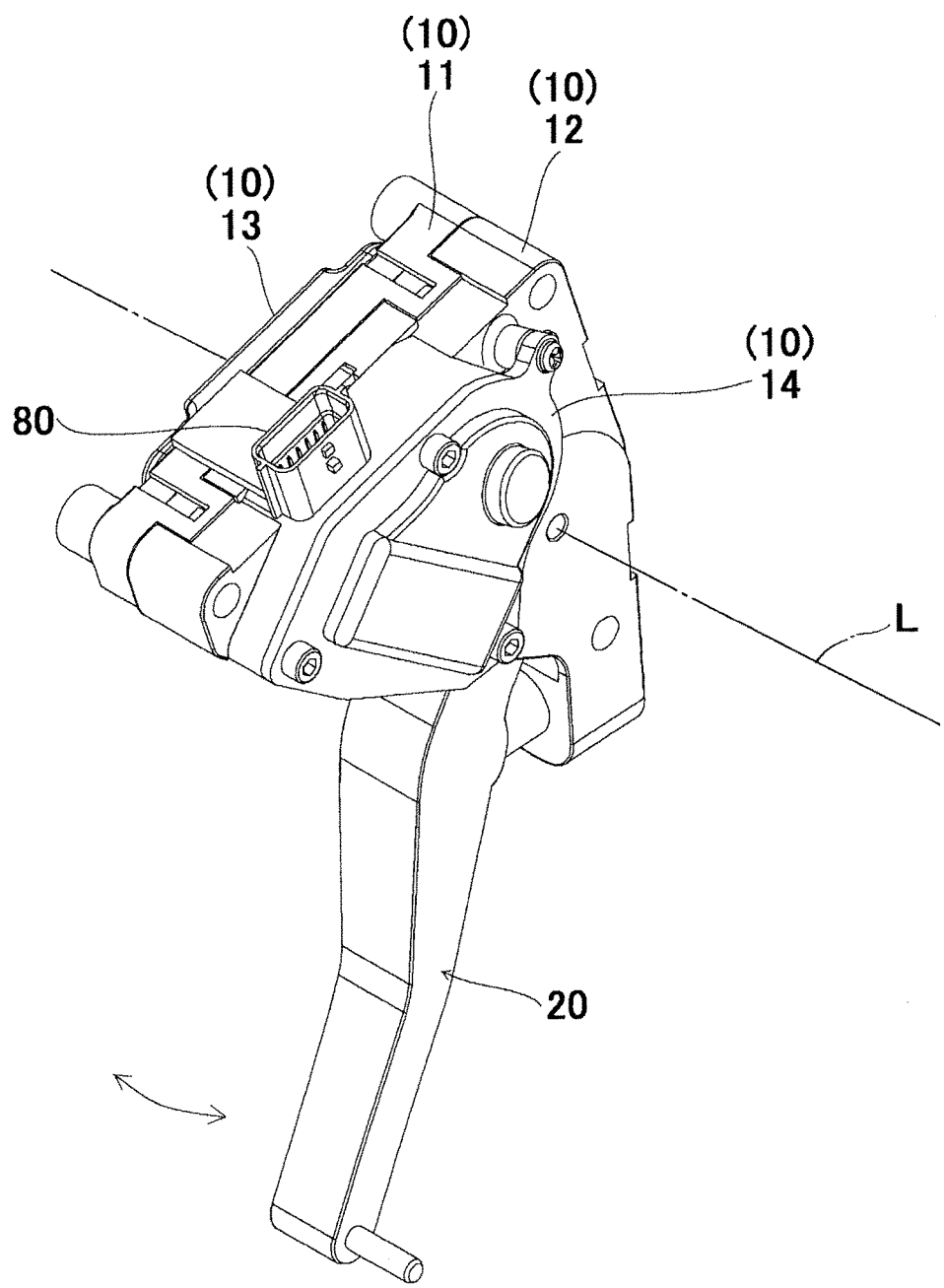
FIG. 1 is a perspective view illustrating an embodiment of an accelerator pedal device according to the present invention.
Figure 2:
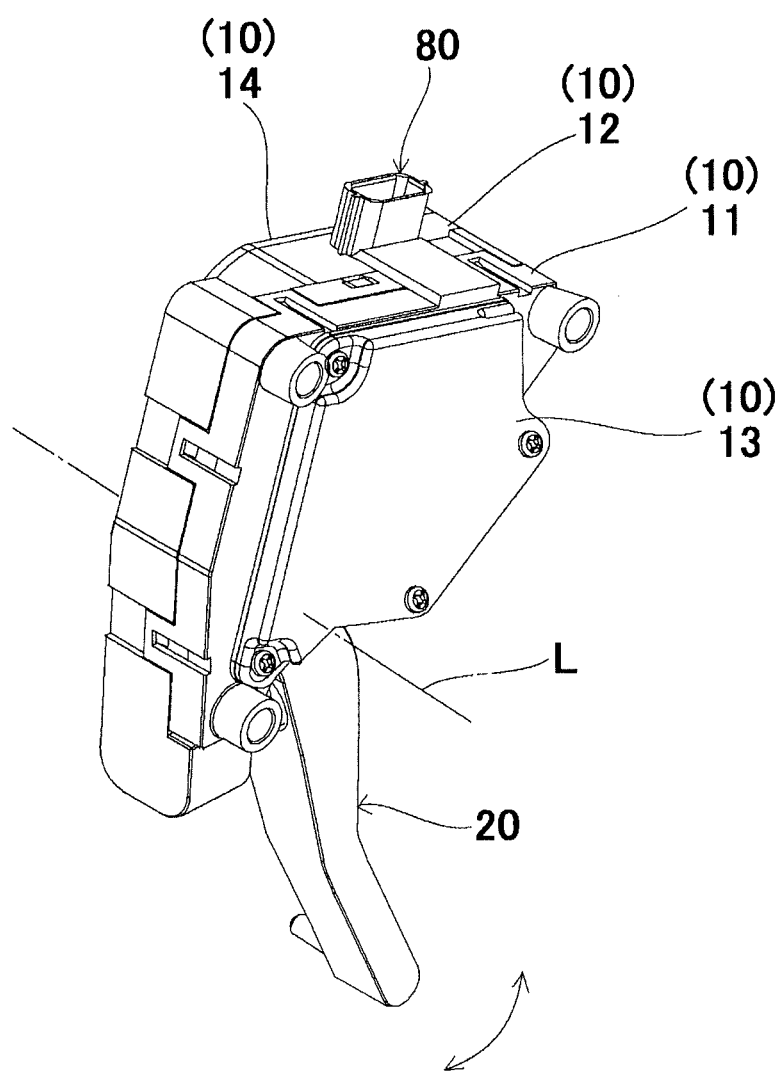
FIG. 2 is a perspective view illustrating an embodiment of the accelerator pedal device according to the present invention.

In the following, embodiments of the present invention will be described with reference to the attached drawings.

As illustrated in FIGS. 1 to 6, an accelerator pedal device includes a housing 10 which is fixed to a vehicle body of an automobile or the like, a pedal arm 20 which is pivotably supported about a predetermined axis line L defined by the housing 10 as being interlocked with an accelerator pedal (not illustrated), a return spring 30 which exerts urging force to return the pedal arm 20 to a rest position, a position sensor 40 (a ring-shaped armature 41, arc-shaped permanent magnets 42, stators 43, and Hall elements 44) which detects a rotational angular position of the pedal arm 20, an active control mechanism 50 (a drive source 51 (a rotor 51a, a coil 51b for magnetization, and a yoke 51c), a return lever 52, and a control circuit board 53) which generates push-back force to push back the pedal arm 20 toward the rest position under predetermined conditions, a temperature sensor 60 which detects temperature of a component (the coil 51b of the drive source 51) of the active control mechanism 50, a hysteresis generating mechanism 70 (a pair of sliders 71, 72 and an urging spring 73) which exerts urging force to return the pedal arm 20 to the rest position and which generates hysteresis at pedaling force (pedaling load), a connector 80 which is electrically connected to the control circuit board 53, and the like.

As illustrated in FIGS. 1 to 5, the housing 10 is structured with a first housing main body 11 and a second housing main body 12 which form a housing main body, and a first housing cover 13 and a second housing cover 14 which form a housing cover.

Figure 3:
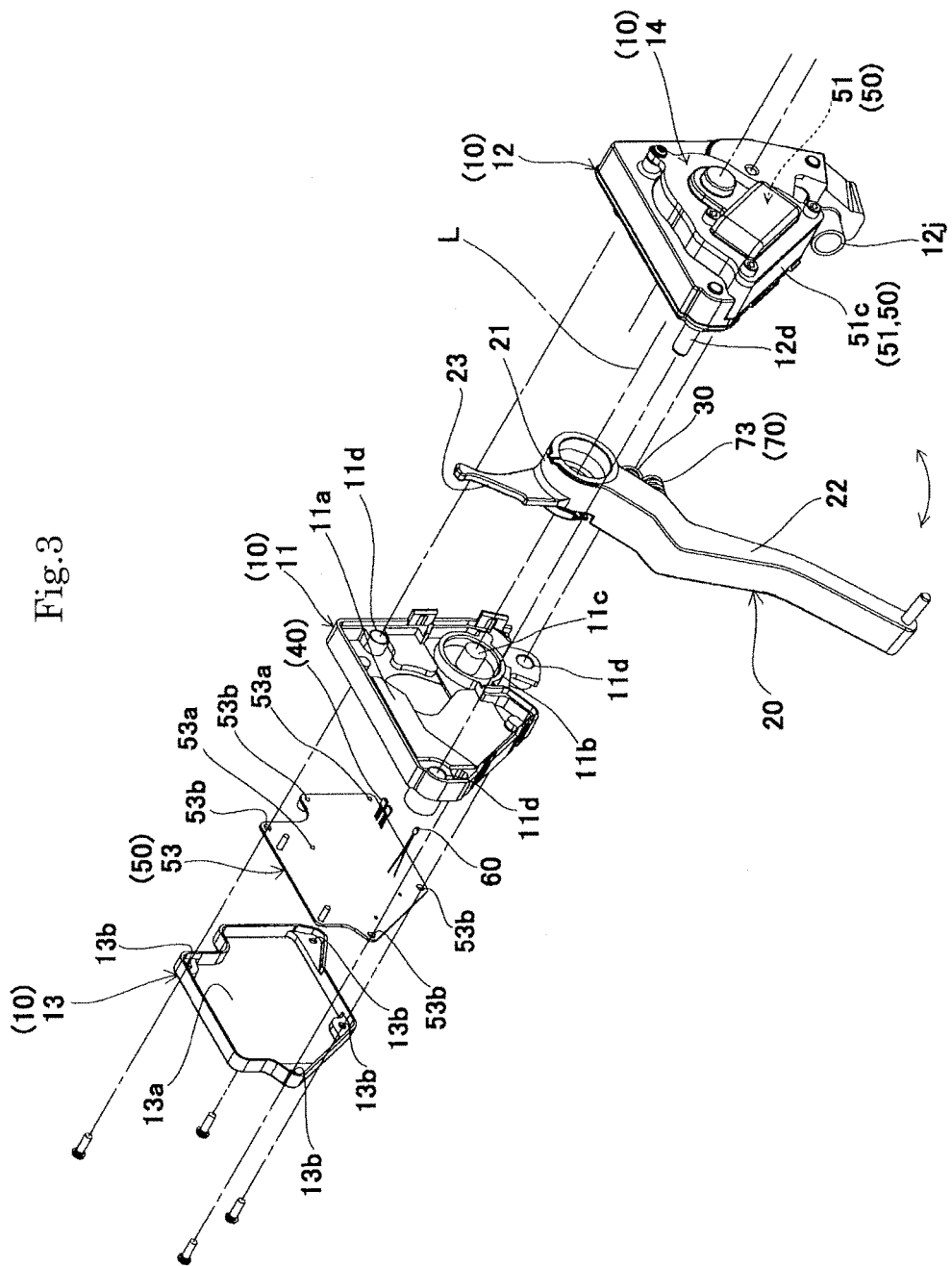
FIG. 3 is an exploded perspective view of the accelerator pedal device illustrated in FIGS. 1 and 2.
Figure 4:
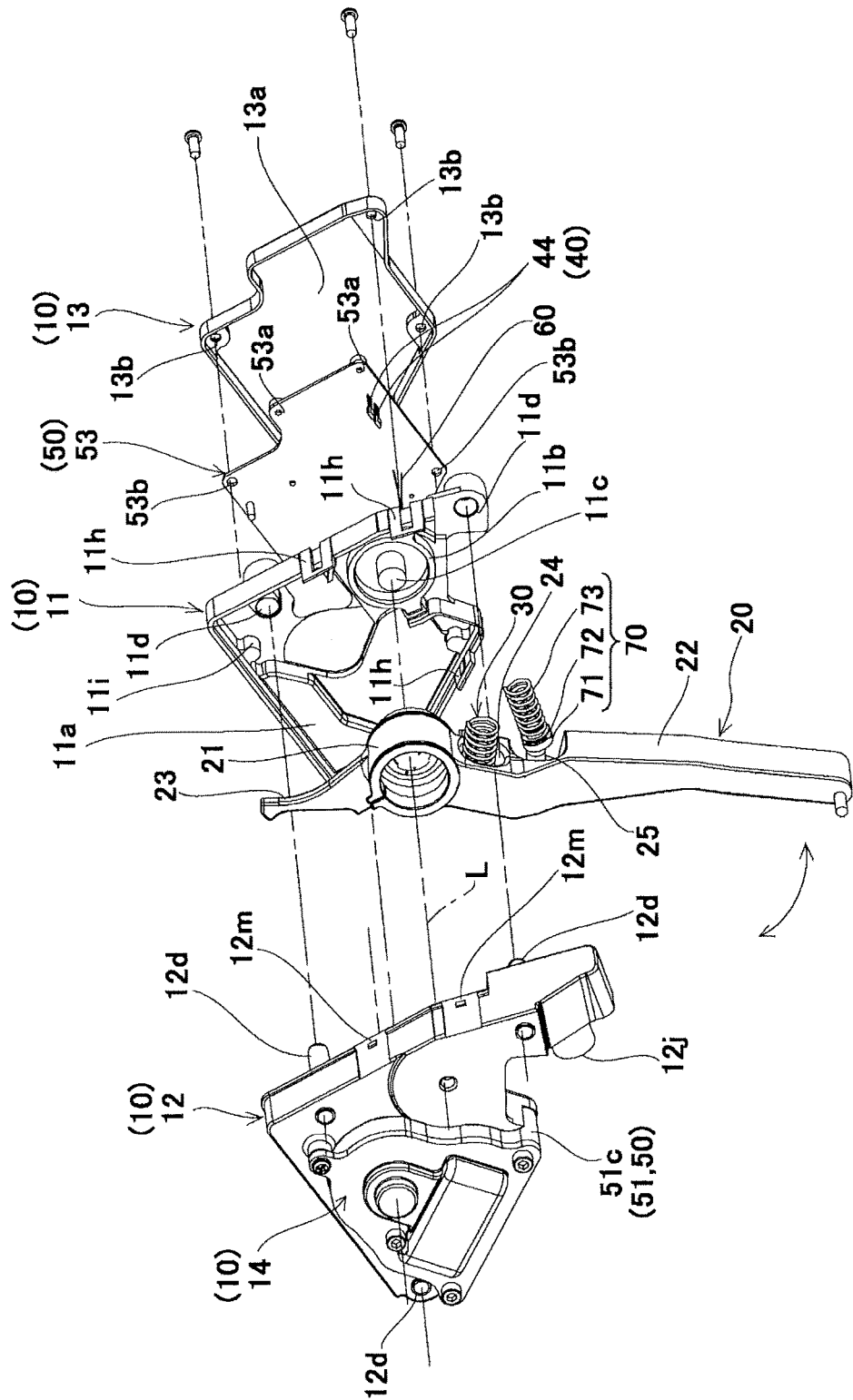
FIG. 4 is an exploded perspective view of the accelerator pedal device illustrated in FIGS. 1 and 2.
Figure 5:
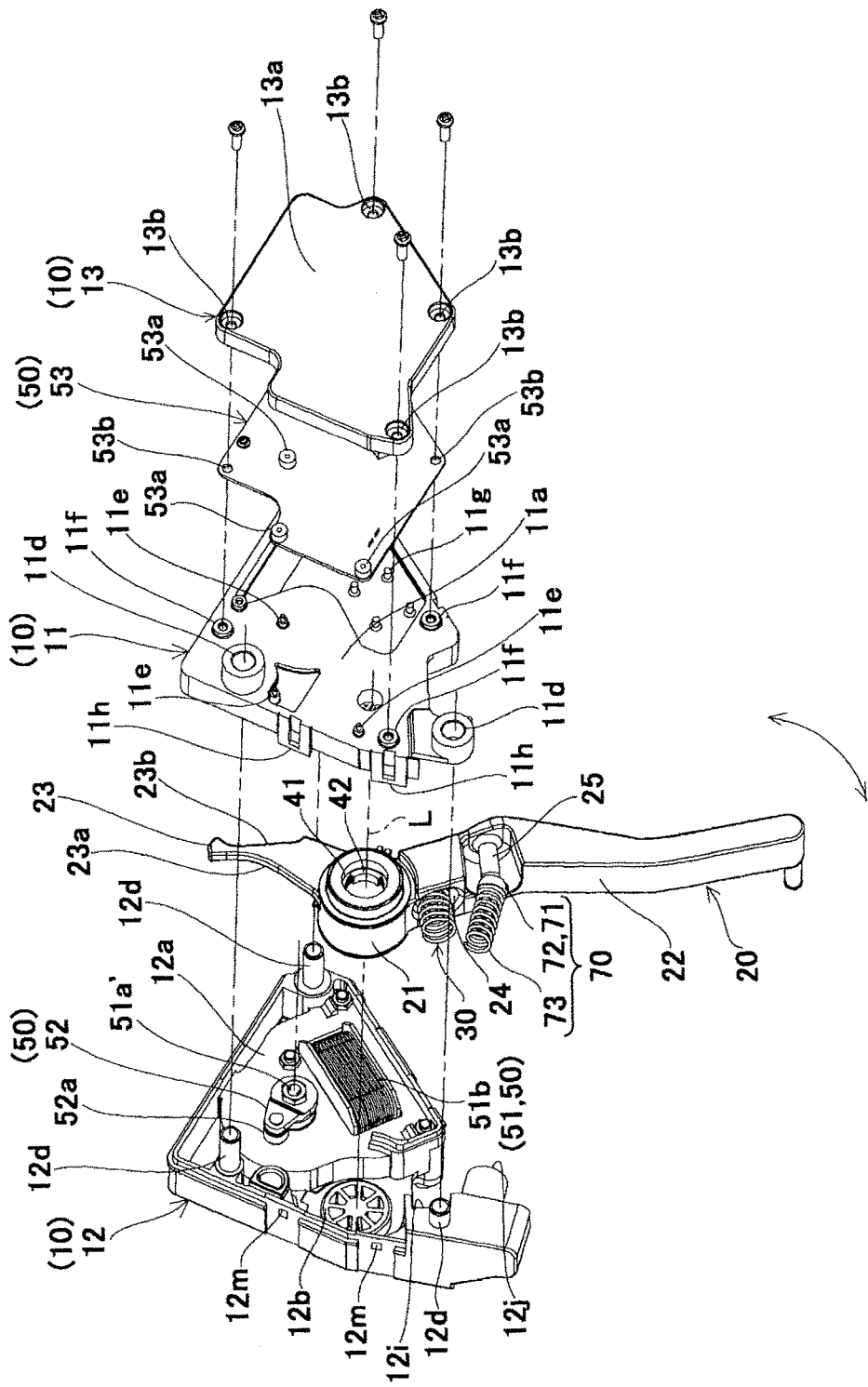
FIG. 5 is an exploded perspective view of the accelerator pedal device illustrated in FIGS. 1 and 2.

The first housing main body 11 is formed of a resin material. As illustrated in FIGS. 3 to 5, the first housing main body 11 includes a side wall portion 11a, a cylinder-shaped bearing portion 11b which is arranged coaxially with the axis line L at the inner side of the side wall portion 11a, a columnar portion 11c which is protruded to the inner side in a direction of the axis line L at a center of the bearing portion 11b and which is formed concavely toward the outer side of the side wall portion 11a, a plurality of connecting holes 11d for connecting the second housing main body 12, a plurality of positioning pins 11e which performs positioning for attaching the control circuit board 53 as being formed at the outer side of the side wall portion 11a, a plurality of screw holes 11f for connecting the first housing cover 13 as being formed at the outer side of the side wall portion 11a, a plurality of terminals 11g which are embedded in the side wall portion 11a for electrically connecting the coil 51 for magnetization included in the drive source 51 to the control circuit board 53, a plurality of connecting pieces 11h for connecting the second housing main body 12, a full-open stopper 11i which defines a maximum depression position of the pedal arm 20, and the like.

Figure 8:
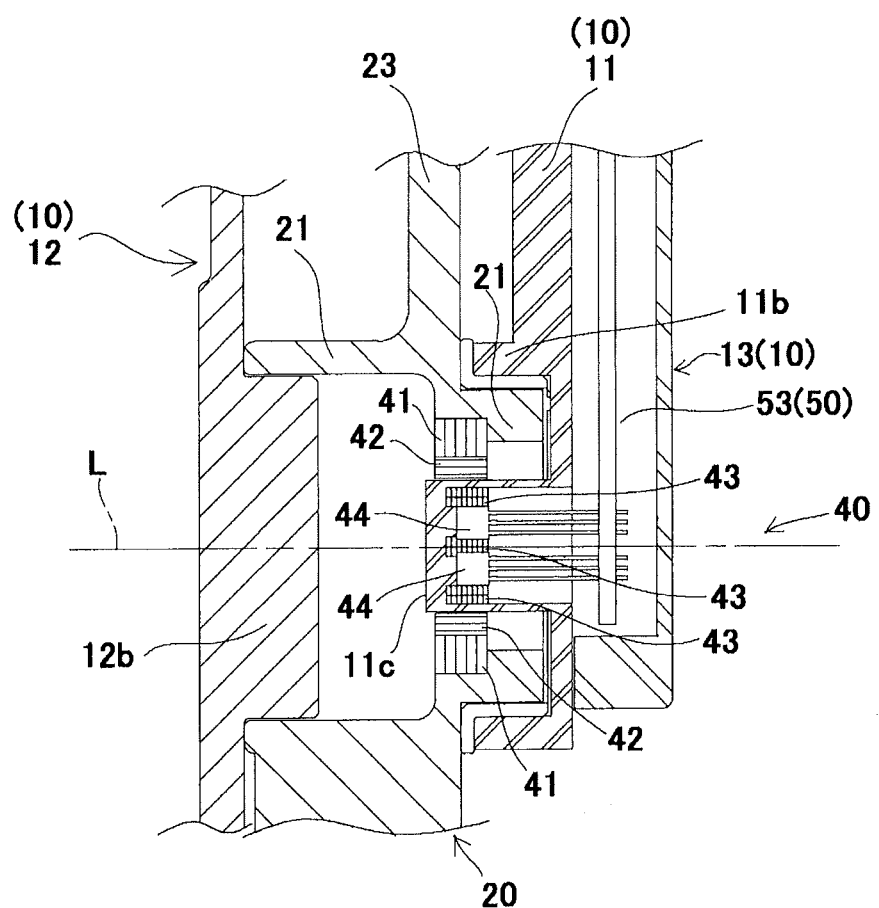
FIG. 8 is a partial sectional view illustrating a structure of a position sensor which is included in the accelerator pedal device illustrated in FIGS. 1 and 2.

As illustrated in FIG. 8, the columnar portion 11c is formed coaxially with the bearing portion 11b, that is, as being centered on the axis line L. Here, the columnar portion 11c is formed to be non-contacted to the ring-shaped armature 41 and a pair of the arc-shaped permanent magnets which are fixed to an inner circumferential face of a cylindrical portion 21 of the pedal arm 20 in a state that the bearing portion 11b is fitted to the cylindrical portion 21.

The second housing main body 12 is formed of a resin material. As illustrated in FIGS. 3 to 6, the second housing main body 12 includes a side wall portion 12a, a column-shaped bearing portion 12b which is arranged coaxially with the axis line L at the inner side of the side wall portion 12a, a plurality of fitting projections 12d for connecting the first housing main body 11, an attaching concave portion 12e for attaching the drive source 51 (the yoke 51c and the coil 51b) as being formed at the outer side of the side wall portion 12a, screw holes 12f for attaching the yoke 51c, a bearing hole 12g which pivotably supports a rotational shaft 51a' of the rotor 51a, an opening portion 12h through which the coil 51b passes, a receiving portion 12i which receives one end part of the return spring 30, a cylindrical portion 12j at which the hysteresis generating mechanism 70 is arranged, screw holes 12k for connecting the second housing cover 14, a plurality of connecting pawls 12m for connecting the first housing main body 11, and the like.

The first housing cover 13 is formed of resin material. As illustrated in FIGS. 3 to 5, the first housing cover 13 includes a side wall portion 13a, a plurality of screw holes 13b, and the like. The first housing cover 13 is formed to be connected in a detachably attachable manner to the first housing main body 11 so as to hold the control circuit board 53 in a state of sandwiching and covering in cooperation with the first housing main body 11.

Figure 6:
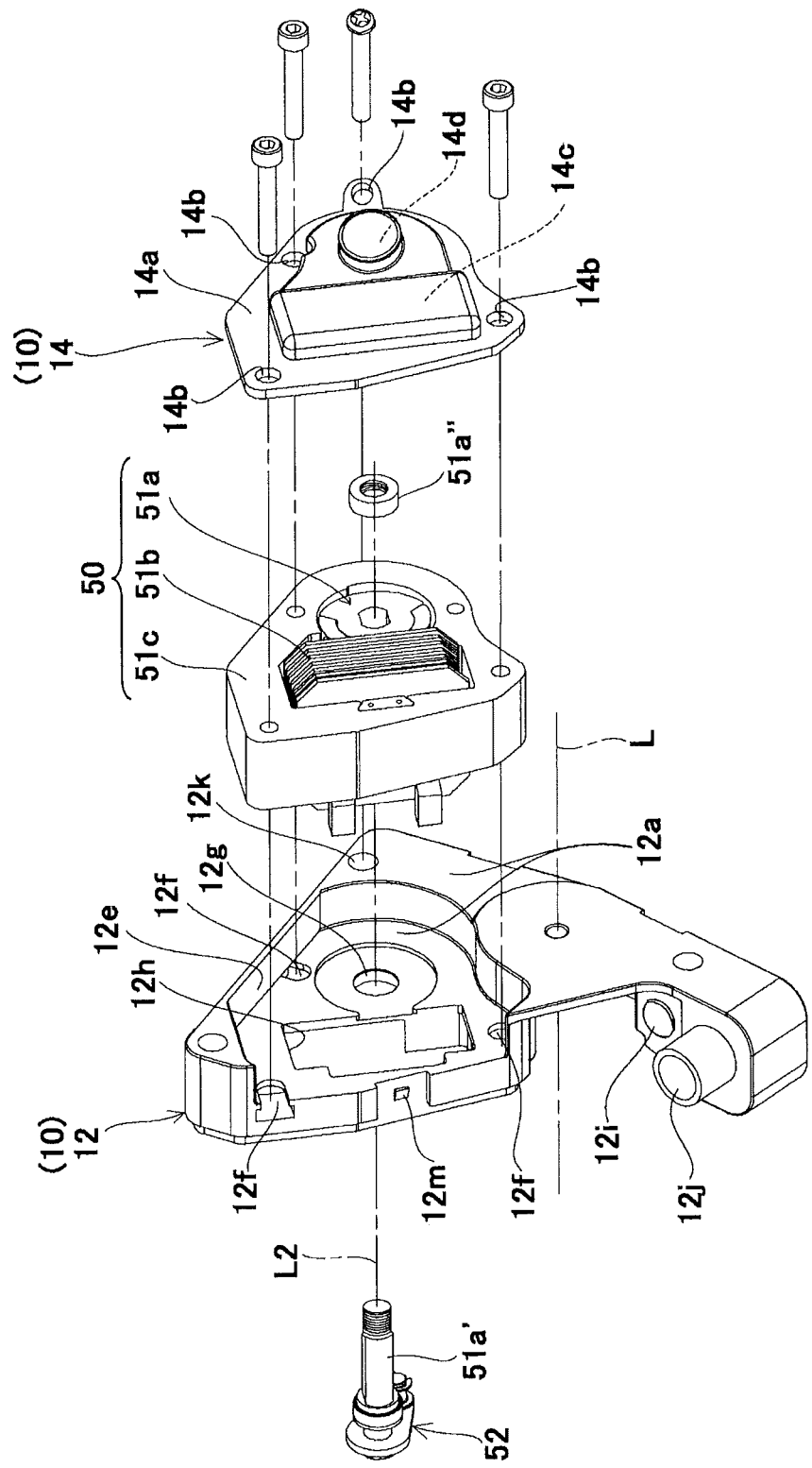
FIG. 6 is an exploded perspective view illustrating a part (a drive source and a return lever) of an active control mechanism which is included in the accelerator pedal device illustrated in FIGS. 1 and 2.

The second housing cover 14 is formed of a metal material (e.g., aluminum) to have enhanced radiation performance. As illustrated in FIGS. 3, 4, and 6, the second housing cover 14 includes a side wall portion 14a, a plurality of screw holes 14b, a concave portion 14c swelled outward to accommodate the coil 51b, a bearing portion 14d which pivotably supports a side of an end part (nut 51a") of the rotor 51a, and the like. The second housing cover 14 is formed to be connected in a detachably attachable manner to the second housing main body 12 and the yoke 51c so as to hold the drive source 51 in a state of sandwiching and covering (with a partial exception) in cooperation with the second housing main body 12.

The pedal arm 20 is formed with resin material in whole. As illustrated in FIGS. 3 to 5, 8, and 9, the pedal arm 20 includes the cylindrical portion 21 which is pivotably supported by the bearing portions 11b, 12b of the housing 10 (the first housing main body 11 and the second housing main body 12), a lower arm 22 which is integrally formed with the cylindrical portion 21 as being extended downward therefrom and which is connected to an accelerator pedal (not illustrated) as being interlocked therewith via a linkage mechanism and the like, an upper arm 23 which is integrally formed with the cylindrical portion 21 as being extended upward therefrom, a receiving portion 24 which receives other end part of the return spring 30 as being formed at the lower arm 22 in the vicinity below the cylindrical portion 21, a rod-shaped contact portion 25 which is contacted to a slider 71 of the hysteresis generating mechanism 70 as being formed in the vicinity below the receiving portion 24, and the like.

As illustrated in FIG. 8, the bearing portion 11b of the first housing main body 11 is fitted to the outside of a small-diameter portion of the cylindrical portion 21 and the bearing portion 12b of the second housing main body 12 is fitted to the inside of a large-diameter portion of the cylindrical portion 21. Accordingly, the cylindrical portion is pivotably supported about the axis line L.

Further, as illustrated in FIGS. 5 and 8, the ring-shaped armature 41 formed of a magnetic material and the pair of arc-shaped permanent magnets 42 connected to an inner circumferential face of the armature 41 are arranged at an inner circumferential face of the small-diameter portion of the cylindrical portion 21.

The upper arm 23 is formed such that the pedal arm 20 is positioned at the rest position, in a state that the pedal arm 20 is pivotably sandwiched by the first housing main body 11 and the second housing main body 12, while a rim portion 23a of the upper arm 23 is contacted to the fitting projection 12d which is arranged at the vicinity of the return lever 52 owing to the urging force of the return spring 30 and that the return lever 52 is contacted to a rim portion 23b to push back the pedal arm 20 toward the rest position.

Figure 9:
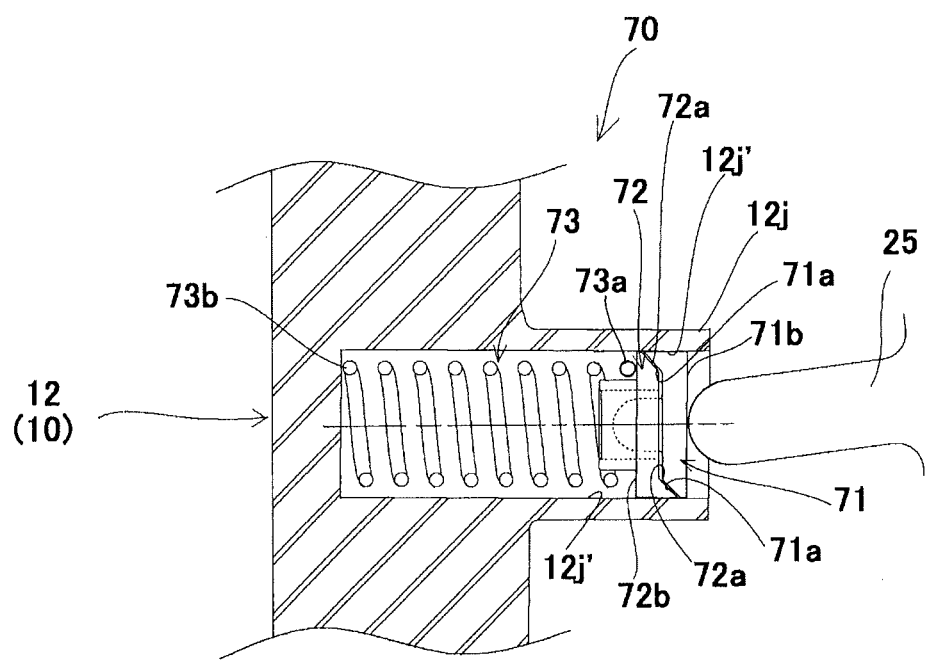
FIG. 9 is a partial sectional view illustrating the hysteresis generating mechanism which is included in the accelerator pedal device illustrated in FIGS. 1 and 2.

As illustrated in FIG. 9, the contact portion 25 is formed so as to be disengageably contacted to the slider 71 of the hysteresis generating mechanism 70 (the pair of sliders 71, 72 and the urging spring 73) which is arranged in the cylindrical portion 12j so that the pair of sliders 71, 72 are compressed against the urging force of the urging spring 73.

As illustrated in FIGS. 4 and 5, the return spring 30 is a compression-type coil spring formed of spring steel or the like. The return spring 30 is arranged in a state of being compressed having a predetermined compression amount with one end part thereof being contacted to the receiving portion 12i of the second housing main body 12 and the other end part being contacted to the receiving portion 24 of the pedal arm 20. Accordingly, the return spring 30 exerts urging force to return the pedal arm 20 to the rest position.

The position sensor 40 is a non-contact type magnetic sensor. As illustrated in FIGS. 5 and 8, the position sensor 40 includes, in an area around the axis line L, the ring-shaped armature 41 formed of a magnetic material as being arranged (held) at the inner circumferential face of the cylindrical portion 21 of the pedal arm 20, the pair of arc-shaped permanent magnets 42 connected to the inner circumferential face of the armature 41, two stators 43 formed of a magnetic material as being arranged (held) to be embedded to the inside of the columnar portion 11c of the first housing main body 11, two Hall elements 44 arranged between the two stators 43, and the like.

The Hall elements 44 are electrically connected to a circuit formed on the control circuit board 53 which is arranged at the outer side of the first housing main body 11 via terminals and the like.

Here, the position sensor 40 (the armature 41, the permanent magnets 42, the stators 43, and the Hall elements 44) is arranged in an area which is separated from the drive source 50 by the side wall portion 12a of the second housing main body 12 and the side wall portion 11a (or a wall portion of the columnar portion 11c) of the first housing main body 11.

That is, according to the position sensor 40, the armature 41 and the permanent magnets 42 are relatively rotated against the stators 43 and the Hall elements 44 with rotation of the pedal arm 20, and then, variation of magnetic flux density due to the relative rotation movement is detected and output as a voltage signal by the Hall elements 44. Thus, an angular position of the pedal arm 20 can be detected.

As illustrated in FIGS. 3 to 6, the active control mechanism 50 includes the drive source 51 which generates rotational drive force caused by electromagnetic force as being arranged and held between the second housing main body 12 and the second housing cover 14, the return lever 52 which is disengageably engaged with the upper arm 23 of the pedal arm 20 as being directly connected to the drive source 51, the control circuit board 53 which controls driving of the drive source 51 as being arranged and held between the first housing main body 11 and the first housing cover 13, and the like.

As illustrated in FIG. 6, the drive source 51 includes the rotor 51a which is rotated with electromagnetic force as integrally having the pair of permanent magnets, the coil 51b for magnetization, and the yoke 51c which forms a magnetic path.

As illustrated in FIG. 6, the rotor 51a includes the rotational shaft 51a' which is supported as passing through the bearing hole 12g of the second housing main body 12 and the nut 51a'' for fastening. The return lever 52 is fixed at an end part of the rotational shaft 51a' to be integrally rotated. Here, the rotor 51a is supported at a side of the nut 51a'' pivotably as well by the bearing portion 14d of the second housing cover 14.

The coil 51b is wound to a magnetization member (not illustrated) via a bobbin. A connection terminal of the coil 51b is connected to a terminal 11g embedded to the first housing main body 11 as passing through the opening portion 12h at the time of being assembled.

The yoke 51c is arranged at the attaching concave portion 12e of the second housing main body 12 and is sandwiched and held by the side wall portion 12a of the second housing main body 12 and the second housing cover 14 in a state of being covered so as not to be exposed except for a part thereof.

That is, the drive source 51 is a torque motor which rotates within a predetermined angular range about an axis line L2 being parallel to the axis line L as including the rotor 51a to which the return lever 52 is directly connected.

Here, not limited to a torque motor, it is possible to adopt an electromagnetic drive source having another structure as long as being capable of rotating the return lever 52 against pedaling force of the pedal arm 20.

As illustrated in FIGS. 5 and 6, the return lever 52 is formed so as to be directly connected to the rotational shaft 51a' of the rotor 51a which is rotated about the axis line L2 and so that a roller 52a at the leading end port thereof is disengageably engaged with the rib portion 23b of the upper arm 23 of the pedal arm 20.

When drive force (rotational torque) is not exerted by the drive source 51, the return lever 52 is freely rotated as following swinging of the pedal arm 20, that is, as following movement of the upper arm 23 without exerting resistance force thereto. On the other hand, when drive force (rotational torque) is exerted by the drive source 51, the return lever 52 exerts push-back force to the upper arm 23 to push back the pedal arm 20 toward the rest position against pedaling force.

As illustrated in FIGS. 3, 5, and 8, the control circuit board 53 includes a plurality of positioning holes 53a to which the positioning pins 11e of the first housing main body 11 are fitted, a plurality of holes 53b through which screws pass, a control circuit which includes a variety of electronic components (control units), a circuit which processes signals output from the Hall elements 44 of the position sensor 40, a circuit which processes signals output from the temperature sensor 60, terminals (bus bars) for electrical connection with the Hall elements 44, a terminal (bus bar) for electrical connection with the temperature sensor 60, and the like.

Here, the control circuit board 53 is arranged and held between the first housing main body 11 and the first housing cover 13 in a state of being covered so as not to be exposed to the outside.

As described above, the circuit for the position sensor 40 (Hall elements 44) which detects an angular position of the pedal arm 20 is arranged on the control circuit board 53. Accordingly, a circuit board dedicated to a conventionally-required position sensor is not required to be arranged and the position sensor (Hall elements 44) is connected via bus bars and the like while eliminating lead wire and the like. Thus, it is possible to achieve reduction of assembling workload, cost reduction, device downsizing, and the like while reducing component count.

Further, an angular position (accelerator opening) of the pedal arm 20 is detected directly by the circuit for the position sensor 40 (Hall elements 44) arranged integrally on the control circuit board 53 via a variety of control circuits on the control circuit board 53. Accordingly, it is not required to arrange a position sensor (MPS) and the like dedicated to a rotational angle of the drive source 51 of the active control mechanism 50. Thus, simplification of structure, reduction in component count, cost reduction, and the like can be further achieved.

Further, the active control mechanism 50 is structured with the drive source 51 (toque motor), the return lever 52 which is disengageably engaged with the upper arm 23 of the pedal arm 20 as being rotationally driven by the drive source 51, and the control circuit board 53. Accordingly, simplification of the active control mechanism 50, downsizing of the device, and the like can be achieved and responsibility can be improved in a case when active control is required under predetermined conditions.

Regarding relational arrangement of the abovementioned structure, the drive source 51 is arranged at one side of the housing main body (the first housing main body 11 and the second housing main body 12) and the control circuit board 53 is arranged at the other side of the housing main body (the first housing main body 11 and the second housing main body 12), and further, the position sensor 40 is arranged in an area which is separated from the drive source 51 by the side wall portion of the housing main body (the first housing main body 11 and the second housing main body 12). That is, the drive source 51 of the active control mechanism 50 is arranged at one side of the housing main body which supports the pedal arm 20 and the control circuit board 53 is arranged at the other side of the housing main body, and further, the position sensor 40 is arranged in an area which is separated from the drive source by the side wall portion of the housing main body. Accordingly, it is possible, without arranging a dedicated magnetic shielding plate or the like, to reduce or prevent influence of a magnetic field of the drive source 51 against a variety of electronic components arranged on the control circuit board 53 and the magnetic position sensor 40 (Hall elements 44) having the circuit thereof arranged on the control circuit board 53.

The temperature sensor 60 is arranged to detect temperature of the coil 51*b* as being held at the outer side of the side wall portion 11*a* of the first housing main body 11. The circuit for processing signals of the temperature sensor 60 is arranged on the control circuit board 53 and is electrically connected to a circuit formed on the control circuit board 53 which is arranged at the outer side of the first housing main body 11 via terminals and the like.

The temperature sensor 60 detects temperature of the coil 51*b*, so that ON/OFF of powering to the coil 51*b* is appropriately controlled based on the detected temperature. Thus, a fail-safe function can be ensured while preventing overheating.

As illustrated in FIGS. 4, 5, 7, and 9, the hysteresis generating mechanism 70 is structured with the slider 71, the slider 72, and the urging spring 73 which are accommodated in the cylindrical portion 12*j* of the second housing main body 12. Here, hysteresis is generated at pedaling force (pedaling load) while the contact portion 25 of the pedal arm 20 is disengageably engaged with the slider 71.

Figure 7:
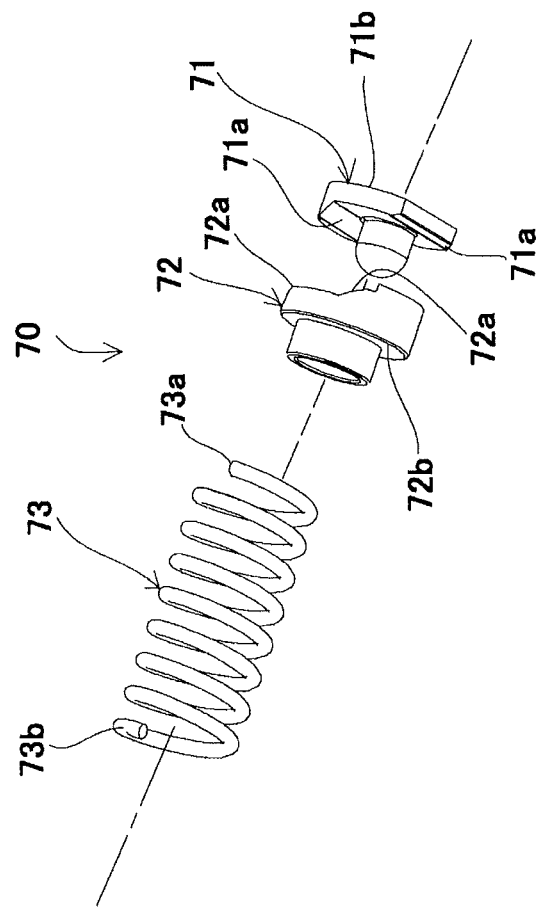
FIG. 7 is an exploded perspective view illustrating a hysteresis generating mechanism which is included in the accelerator pedal device illustrated in FIGS. 1 and 2.

The slider 41 is formed of resin material (e.g., high slidability material such as oil-containing polyacetal or the like) and is provided, as illustrated in FIGS. 7 and 9, with an inclined face 71*a* which is slidably contacted to an inner wall face 12*j'* of the cylindrical portion 12*j* and is contacted to an inclined face 72*a* of the slider 72, an engaging face 71*b* with which the contact portion 25 of the pedal arm 20 is disengageably engaged, and the like.

The slider 72 is formed of resin material (e.g., high slidability material such as oil-containing polyacetal or the like) and is provided, as illustrated in FIGS. 7 and 9, with an inclined face 72*a* which is slidably contacted to the inner wall face 12*j'* of the cylindrical portion 12*j* and is contacted to the inclined face 71*a* of the slider 71, a receiving face 72*b* which receives one end part of the urging spring 73, and the like.

As illustrated in FIGS. 7 and 9, the urging spring 73 is a compression-type coil spring formed of spring steel or the like. The urging spring 73 is arranged in a state of being compressed having a predetermined compression amount with one end part 73*a* thereof being engaged with the receiving face 72*b* of the slider 72 and the other end part 73*b* thereof being engaged with a bottom wall of the cylindrical portion 12*j* of the second housing main body 12. Accordingly, the urging spring 73 exerts urging force to return the pedal arm 20 to the rest position via the pair of sliders 71, 72 while providing a wedge action such that the slider 71 and the slider 72 are pressed toward the inner wall face 12*j'* with pressing of the inclined face 72*a* of the slider 72 to the inclined face 71*a* of the slider 71.

Accordingly, in a case that the pedal arm 20 is depressed toward the maximum depression position (full-open position) against the urging force of the return spring 30 (and the urging spring 73), the contact portion 25 presses the slider 71 leftward in FIG. 9 against the urging force of the urging spring 73. Consequently, friction force (slide friction) caused by the wedge action of the inclined faces 71*a*, 72*a* is increased linearly in accordance with increase of the urging force of the urging spring 73.

On the other hand, in a case that the pedal arm 20 is returned toward the rest position in accordance with the urging force of the return spring 30 (and the urging spring 73), the friction force (slide friction) caused by the wedge action of the inclined faces 71*a*, 72*a* is to be decreased. Owing to that the slider 71 and the slider 72 are moved rightward in FIG. 9 to an original position with the urging force of the urging spring 73, the friction force is linearly decreased in accordance with decrease of the urging force of the urging spring 73. Since the friction force during returning operation is smaller than the friction force during depressing operation, hysteresis can be generated at the pedaling force (pedaling load) entirely from the depressing operation to the returning operation.

Here, when the slider 71 is stuck and stopped at a midpoint during the returning operation, the pedal arm 20 is returned to the predetermined rest position while the contact portion 25 is disengaged from (the engaging face 71b of) the slider 71 owing to the urging force of the return spring 30.

According to the accelerator pedal device having the abovementioned structure, it is possible to achieve simplification of structure, reduction in component count, cost reduction, downsizing of the whole device, and the like. Further, it is possible, without adopting special measures such as a magnetic shielding plate and the like, to reduce or prevent influence of the magnetic field of the drive source 51 which is included in the active control mechanism 50 against the magnetic position sensor 40 (APS) which detects an angular position of the pedal arm 20. Furthermore, active control having high responsibility can be performed.

Next, operation of the accelerator pedal device will be described.

First, when the accelerator pedal at the rest position without being depressed by a driver, the upper arm 23 is contacted to the engaging projection 12d with the urging force of the return spring 30 and the pedal arm 20 is stopped at the rest position. At that time, the contact portion 25 of the pedal arm 20 is in a state of being disengageably engaged with the engaging face 71b of the slider 71. Here, (the roller 52a of) the return lever 52 is in an engaged state with the upper arm 23 without exerting returning force.

When the accelerator pedal is depressed by the driver from the abovementioned state, the pedal arm 20 is rotated against the urging force of the return spring 30. Then, the pedal arm 20 is rotated to the maximum depression position (full-open position) while increasing friction load (push-back load) generated by the hysteresis generating mechanism 70. Consequently, (the rim portion 23b of) the upper arm 23 is contacted to the full-open stopper 11i of the housing 10 (first housing main body 11) and the pedal arm 20 is stopped. During the depressing operation, the return lever 52 follows movement of the upper arm 23 without exerting any load (push-back force).

When the driver releases pedaling force, the pedal arm 20 is moved toward the rest position with the urging force of the return spring 30 while friction load (pedaling load) being smaller than the friction load (pedaling load) during depression is exerted to the operator (driver). Consequently, (the rim portion 23a of) the upper arm 23 is contacted to the engaging projection 12d of the housing 10 (second housing main body 12) and the pedal arm 20 is stopped. During the returning operation, the return lever 52 follows movement of the upper arm 23 without exerting any load (push-back force).

On the other hand, when it is determined (by a separated inter-vehicular distance detection system or the like), for example, that danger avoidance or danger notification is required (that is, under predetermined conditions) in a state that the accelerator pedal is depressed by the driver, the drive source 51 of the active control mechanism 50 is activated and is drive-controlled to push-back the pedal arm 20 toward the rest position against the pedaling force of the driver while the return lever 52 generates rotational torque (push-back force). Such control is performed based on control signals from (a control unit on) the control circuit board 53 and output signals from the position sensor 40, and the like.

Further, since the push-back force of the return lever 52 is directly exerted to (the upper arm 23 of) the pedal arm 20, the hysteresis generating mechanism 70 can be prevented from being influenced thereby and desired hysteresis characteristics at the pedaling force can be obtained.

Further, since the return lever 52 is disengageable from the upper arm 23 of the pedal arm 20, it is possible to reliably ensure returning of the pedal arm 20 to a safe side (the rest position) even if the active control mechanism 50 fails.

Further, since the urging force is exerted directly from the return spring 30, it is possible to reliably ensure returning of the pedal arm 20 to the safe side (the rest position) even if the hysteresis generating mechanism 70 and the active control mechanism 50 fail.

According to the accelerator pedal device having the abovementioned structure, pedaling force with hysteresis generated by the hysteresis generating mechanism 70 can be obtained while a driver operates an accelerator pedal and the pedal arm 20 is rotated between the rest position and the maximum depression position. Further, under predetermined conditions (for example, in a case that danger avoidance, danger notification or the like is required during operation of a vehicle), it is possible to generate push-back force to push back the pedal arm 20 against pedaling force of the driver with operation of the active control mechanism 50.

In the abovementioned embodiment, description is performed on the structure with the hysteresis generating mechanism 70. However, not limited to this, it is also possible to adopt the present invention to a structure without having a hysteresis generating mechanism.

In the abovementioned embodiment, description is performed on the case that the return lever 52 and the pedal arm 20 rotate in the same direction. However, not limited to this, it is also possible to adopt a structure that push-back force is exerted while a return lever is rotated in a direction being reverse to the rotational direction of the pedal arm 20.

In the abovementioned embodiment, description is performed on the case that the pedal arm 20 is arranged separately from the accelerator pedal which is swingably supported by a floor face of a vehicle or the like and is interlocked with the accelerator pedal. However, it is also possible to adopt the present invention to a structure with a pedal arm which integrally includes an accelerator pedal.

In the abovementioned embodiment, description is performed on the case that the housing main body of the housing 10 is structured with the first housing main body 11 and the second housing main body 12 while the housing cover of the housing 10 is structured with the first housing cover 13 and the second housing cover 14. However, not limited to this, it is also possible that the housing main body is formed integrally and a drive source and a control circuit board are separately arranged as being divided by the housing main body.

INDUSTRIAL APPLICABILITY

As described above, according to the accelerator pedal device of the present invention, it is possible to achieve simplification of structure, reduction in component count, cost reduction, downsizing of the whole device, and the like. Further, it is possible, without adopting special measures such as a magnetic shielding plate and the like, to reduce or prevent influence of a magnetic field of a drive source which is included in an active control mechanism against a magnetic position sensor (APS) which detects an angular position of a pedal arm. Furthermore, active control having high responsibility can be performed. Therefore, the present invention is useful for motorcycles and other vehicles as well as being capable of being applied to automobiles.

EXPLANATION OF REFERENCES

L Axis line
10 Housing

11 First housing main body
11a Side wall portion
11b Bearing portion
11c Columnar portion
11d Connecting hole
11e Positioning pin
11f Screw hole
11g Terminal
11h Connecting piece
11i Full-open stopper
12 Second housing main body
12a Side wall portion
12b Bearing portion
12d Fitting projection
12e Attaching concave portion
12f Screw hole
12g Bearing hole
12h Opening portion
12i Receiving portion
12j Cylindrical portion
12j' Inner wall face
12k Screw hole
12m Connecting pawl
13 First housing cover
13a Side wall portion
13b Screw hole
14 Second housing cover
14a Side wall portion
14b Screw hole
14c Concave portion
14d Bearing portion
20 Pedal arm
21 Cylindrical portion
22 Lower arm
23 Upper arm
24 Receiving portion
25 Contact portion
30 Return spring
40 Position sensor
41 Ring-shaped armature
42 Permanent magnet
43 Stator
44 Hall element
50 Active control mechanism
51 Drive source
51a Rotor
51a' Rotational shaft
51b Coil for magnetization
51c Yoke
52 Return lever
52a Roller
53 Control circuit board
60 Temperature sensor
70 Hysteresis generating mechanism
71 Slider
71a Inclined face
71b Engaging face
72 Slider
72a Inclined face
72b Receiving face
73 Urging spring
80 Connector

The invention claimed is:

1. An accelerator pedal device, comprising:
a pedal arm formed with resin material;
a first housing main body and a second housing main body which are formed with resin material and arranged to sandwich the pedal arm from opposing sides along a predetermined axis line, the first housing main body having a first side wall portion and a first bearing portion which is arranged coaxially with the predetermined axis line at an inner side of the first side wall portion;
the second housing main body having a second side wall portion and a second bearing portion which is arranged coaxially with the predetermined axis line at an inner side of the second side wall portion, the first bearing portion and the second bearing portion pivotably supporting the pedal arm about the predetermined axis line between a rest position and a maximum depression position by sandwiching the pedal arm in cooperation with each other;
a first housing cover connected to the first housing main body at an outer side of the first side wall portion opposite to the inner side of the first side wall portion where the second housing main body is connected;
a return spring for exerting urging force to return the pedal arm to the rest position;
a single position sensor for detecting an angular position of the pedal arm, the single position sensor including a ring-shaped armature and an arc-shaped permanent magnet both held at a cylindrical portion of the pedal arm, and a stator and a Hall element both arranged at a columnar portion formed at the inner side of the first side wall portion coaxially with the cylindrical portion, the stator being formed of a magnetic material;
a return lever for exerting a returning force to the pedal arm by coming into contact with the pedal arm;
a torque motor for rotating the return lever; and
a single control circuit board electrically connected to the torque motor by terminals embedded within the first side wall portion,
wherein the torque motor is arranged at the second housing main body from an outer side of the second side wall portion opposite to the inner side of the second side wall portion,
the control circuit board is arranged and held at the outer side of the first side wall portion between the first housing main body and the first housing cover, and
the position sensor is arranged so as to be separated from the torque motor by the first side wall portion and the second side wall portion and is connected electrically with the control circuit board.

2. The accelerator pedal device according to claim 1, further comprising a second housing cover connected to the second housing main body so as to cover the torque motor in cooperation with the second housing main body.

3. The accelerator pedal device according to claim 1, wherein the torque motor includes a rotor which integrally includes a permanent magnet and rotates with electromagnetic force, a coil for magnetization, and a yoke which forms a magnetic path,
a temperature sensor for detecting temperature of the coil is held at the first housing main body, and
a circuit for the temperature sensor is arranged on the control circuit board.

4. The accelerator pedal device according to claim 1, further comprising a hysteresis generating mechanism which generates hysteresis at pedaling force contacted to the pedal arm,
wherein the second housing main body includes a cylindrical portion, and
the hysteresis generating mechanism includes a pair of sliders which generates pressing force against an inner wall face of the cylindrical portion of the second housing main body with a wedge action caused by the pedaling force of the pedal arm as being slidably arranged in the cylindrical portion of the second housing main body, and an urging spring which urges the pedal arm toward the rest position as being contacted to one of the pair of sliders.

\* \* \* \* \*